(12) United States Patent
Chen et al.

(10) Patent No.: US 6,792,134 B2
(45) Date of Patent: Sep. 14, 2004

(54) MULTI-MODE DIGITAL IMAGE PROCESSING METHOD FOR DETECTING EYES

(75) Inventors: Shoupu Chen, Rochester, NY (US); Lawrence A. Ray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 627 days.

(21) Appl. No.: 09/740,562

(22) Filed: Dec. 19, 2000

(65) Prior Publication Data

US 2002/0114495 A1 Aug. 22, 2002

(51) Int. Cl.[7] .................................................. G06K 9/00
(52) U.S. Cl. ...................... 382/117; 340/5.53; 340/5.83; 345/171; 345/172; 382/117; 382/118; 382/164; 382/192; 382/203; 382/225
(58) Field of Search ............................ 340/5.53, 5.83; 345/863; 348/169; 356/71; 382/103, 117–118, 133, 159, 164, 170, 192, 194, 203, 224–225

(56) References Cited

U.S. PATENT DOCUMENTS

| | | | |
|---|---|---|---|
| 4,379,890 A | | 4/1983 | Konietzny et al. |
| 5,016,282 A | * | 5/1991 | Tomono et al. .............. 382/117 |
| 5,089,976 A | | 2/1992 | Cate et al. |
| 5,128,711 A | | 7/1992 | Terashita et al. |
| 5,130,789 A | | 7/1992 | Dobbs et al. |
| 5,432,863 A | | 7/1995 | Benati et al. |
| 5,570,698 A | * | 11/1996 | Liang et al. ................. 600/558 |
| 5,859,921 A | * | 1/1999 | Suzuki ......................... 382/118 |
| 5,878,156 A | * | 3/1999 | Okumura ...................... 382/118 |
| 5,917,936 A | * | 6/1999 | Katto ........................... 382/154 |
| 5,926,251 A | * | 7/1999 | Okumura ...................... 351/209 |
| 5,990,973 A | | 11/1999 | Sakamoto |
| 6,009,209 A | | 12/1999 | Acker et al. |
| 6,016,354 A | * | 1/2000 | Lin et al. ..................... 382/117 |
| 6,028,960 A | * | 2/2000 | Graf et al. ................... 382/203 |
| 6,072,892 A | | 6/2000 | Kim |
| 6,108,446 A | * | 8/2000 | Hoshen ....................... 382/225 |
| 6,154,559 A | * | 11/2000 | Beardsley .................... 382/103 |
| 6,252,976 B1 | * | 6/2001 | Schildkraut et al. ......... 382/117 |
| 6,292,171 B1 | * | 9/2001 | Fu et al. ...................... 345/156 |
| 6,292,574 B1 | | 9/2001 | Schildkraut et al. |
| 6,307,954 B1 | * | 10/2001 | Suzaki ......................... 382/117 |
| 6,332,033 B1 | * | 12/2001 | Qian ............................ 382/124 |
| 6,332,038 B1 | * | 12/2001 | Funayama et al. .......... 382/190 |
| 6,381,345 B1 | * | 4/2002 | Swain .......................... 382/117 |
| 6,463,173 B1 | * | 10/2002 | Tretter ......................... 382/168 |
| 6,526,160 B1 | * | 2/2003 | Ito ............................... 382/117 |
| 6,542,624 B1 | * | 4/2003 | Oda ............................. 382/117 |

FOREIGN PATENT DOCUMENTS

| | | |
|---|---|---|
| EP | 0 635 972 A2 | 7/1994 |
| EP | 0 858 905 A1 | 8/1998 |
| JP | HEI 9 1997 216580 | 3/1996 |

OTHER PUBLICATIONS

Eli Saber, Xerox Corp., A. Murat Tekalp, Dept. of Engineering, Univ. of Rochester, Face Detection and Facial Feature Extraction Using Color, Shape and Symmetry–Based Cost Functions, Aug. 25, 1996, pp. 654–658, 1996 IEEE.

Jie Yang and Alex Waibel, School of Computer Science, Carnegie Mellon Univ., A Real–Time Face Tracker, 5/96, pp. 142–147, 1996 IEEE.

* cited by examiner

*Primary Examiner*—Bsavesh M. Mehta
*Assistant Examiner*—Gregory Desire
(74) *Attorney, Agent, or Firm*—Roland R. Schindler, II

(57) ABSTRACT

The present invention comprises a digital image processing method for detecting human eyes in a digital image. This method comprises the steps of: detecting iris pixels in the image; clustering the iris pixels, and selecting at least one of the following methods to identify eye positions: applying geometric reasoning to detect eye positions using the iris pixel clusters; applying a summation of squared difference method using the iris pixel clusters to detect eye positions; and applying a summation of squared difference method to detect eye positions from the pixels in the image. The method applied is selected on the basis of the number of iris pixel clusters. In another embodiment, the present invention also comprises a computer program product.

42 Claims, 6 Drawing Sheets

MULTI-MODE DIGITAL IMAGE PROCESSING METHOD FOR DETECTING EYES

FIELD OF THE INVENTION

The present invention relates to digital image processing methods for detecting facial features and more particularly to methods for detecting human eyes.

BACKGROUND OF THE INVENTION

In digital image processing it is often useful to detect human eyes in an image. This information is used, for example, to locate other features in the image such as human visual orientation. This information can also be used for other purposes such as finding the orientation of a human face in the image.

Methods are known in the art for finding human eyes in a digital image. For example, U.S. Pat. No. 6,072,892 discloses the use of a thresholding method to detect the position of human eyes in a digital image. In this method, a scanning window scans across the entire image using a raster scanning method. A histogram extractor extracts an intensity histogram from the window as it scans across the image. Each intensity histogram is examined by a peak detector to find three peaks in the histogram representing the skin, the white of the eye, and the black of the pupil. A histogram having the three peaks identifies a location in an image that potentially defines an eye position. Eye position is determined from among the potential locations by calculating the area under the histogram associated with each potential location and by selecting the location that is associated with the histogram with the largest area.

One of the problems with this approach is that the entire image must be scanned on a pixel-by-pixel basis. Thus, a search window must be positioned at each pixel in the image and a histogram must be assembled at each pixel location. Further, the area under each histogram must be calculated and stored. It will be appreciated that this method consumes enormous amounts of computing power and reduces the rate at which images can be processed. This method can also produce a high rate of false positives.

Methods are also known to detect human eyes that have abnormally high red content. Such abnormally high red content is commonly associated with a photographic phenomenon known as red eye. Red eye is typically caused by a flash of light that is reflected by a pupil. As is described in commonly assigned and co-pending U.S. patent application Ser. No. 08/919,560, it is known to search in images for pixels having the high red content that is indicative of red eye. Similarly, commonly assigned U.S. Pat. No. 5,432,863 describes a user interactive method for detecting pixels in an image that have color characteristic of red eye. It will be recognized that these methods detect eyes only where red eye is present.

Thus, there is a need for a method to locate human eyes in a digital image with greater accuracy and efficiency.

SUMMARY OF THE INVENTION

The need is met according to the present invention by a digital image processing method for detecting human eyes in a digital image. This method comprises the steps of: detecting iris pixels in the image; clustering the iris pixels, and selecting at least one of the following methods to identify eye positions: applying geometric reasoning to detect eye positions using the iris pixel clusters; applying a summation of squared difference method using the iris pixel clusters to detect eye positions; and applying a summation of squared difference method to detect eye positions from the pixels in the image; wherein, the method applied is selected on the basis of the number of iris pixel clusters.

The need is also met in another embodiment of the present invention, by a computer program product. The computer program product comprises a computer readable storage medium having a computer program stored thereon for performing the steps of: detecting iris pixels in the image; clustering the iris pixels, and selecting at least one of the following methods to identify eye positions: applying geometric reasoning to detect eye positions using the iris pixel clusters; applying a summation of squared difference method using the iris pixel clusters to detect eye positions; and applying a summation of squared difference method to detect eye positions from the pixels in the image; wherein, the method applied is selected on the basis of the number of iris pixel clusters.

DETAILED DESCRIPTION OF THE INVENTION

Figure 1:
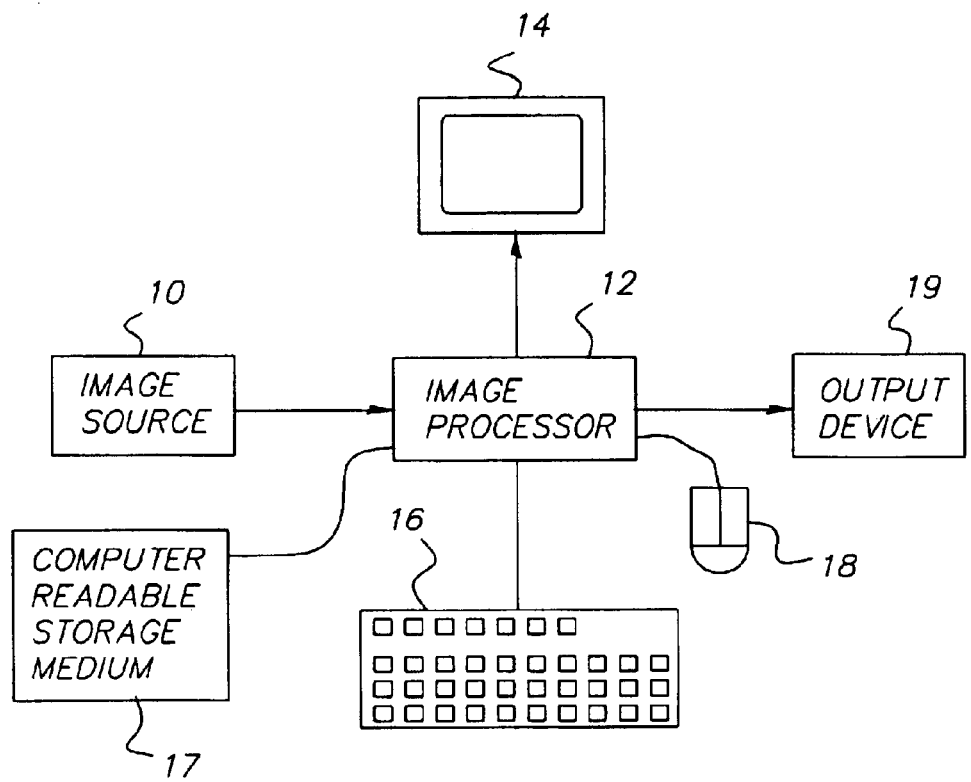
FIG. 1 is a schematic diagram of an image processing system useful in practicing the present invention.

FIG. 1, shows an image processing system useful in practicing the present invention including a color digital image source 10, such as a film scanner, digital camera, or digital image storage device such as a compact disk drive with a Picture CD. The digital image from the digital image source 10 is provided to an image processor 12, such as a programmed personal computer, or digital image processing work station such as a Sun Sparc 20 workstation. The image processor 12 may be connected to a CRT display 14, and an operator interface such as a keyboard 16 and a mouse 18. The image processor 12 is also connected to a computer readable storage medium 17. The image processor 12 transmits processed digital images to an output device 19. Output device 19 can comprise a hard copy printer, a long term image storage device, a connection to another processor, or an image telecommunication device connected, for example, to the internet.

In the following description, a preferred embodiment of the present invention will be described as a method. However, in another preferred embodiment, the present invention comprises a computer program product for detecting human eyes in a digital image in accordance with the method described. In describing the present invention, it should be apparent that the computer program of the present invention can be utilized by any well-known computer system, such as the personal computer of the type shown in FIG. 1. However, many other types of computer systems can be used to execute the computer program of the present invention. Consequently, the computer system will not be discussed in further detail herein.

It will be understood that the computer program product of the present invention may make use of image manipulation algorithms and processes that are well known. Accordingly, the present description will be directed in particular to those algorithms and processes forming part of, or cooperating more directly with, the method of the present invention. Thus, it will be understood that the computer program product embodiment of the present invention may embody algorithms and processes not specifically shown or described herein that are useful for implementation. Such algorithms and processes are conventional and within the ordinary skill in such arts.

Additional aspects of such algorithms and systems, and hardware and/or software for producing and otherwise processing the images or cooperating with the computer program product of the present invention, are not specifically shown or described herein and may be selected from such algorithms, systems, hardware, components and elements known in the art.

The computer program for performing the method of the present invention may be stored in a computer readable storage medium. This medium may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other communication medium. Those skilled in the art will readily recognize that the equivalent of such a computer program product may also be constructed in hardware.

Figure 2:
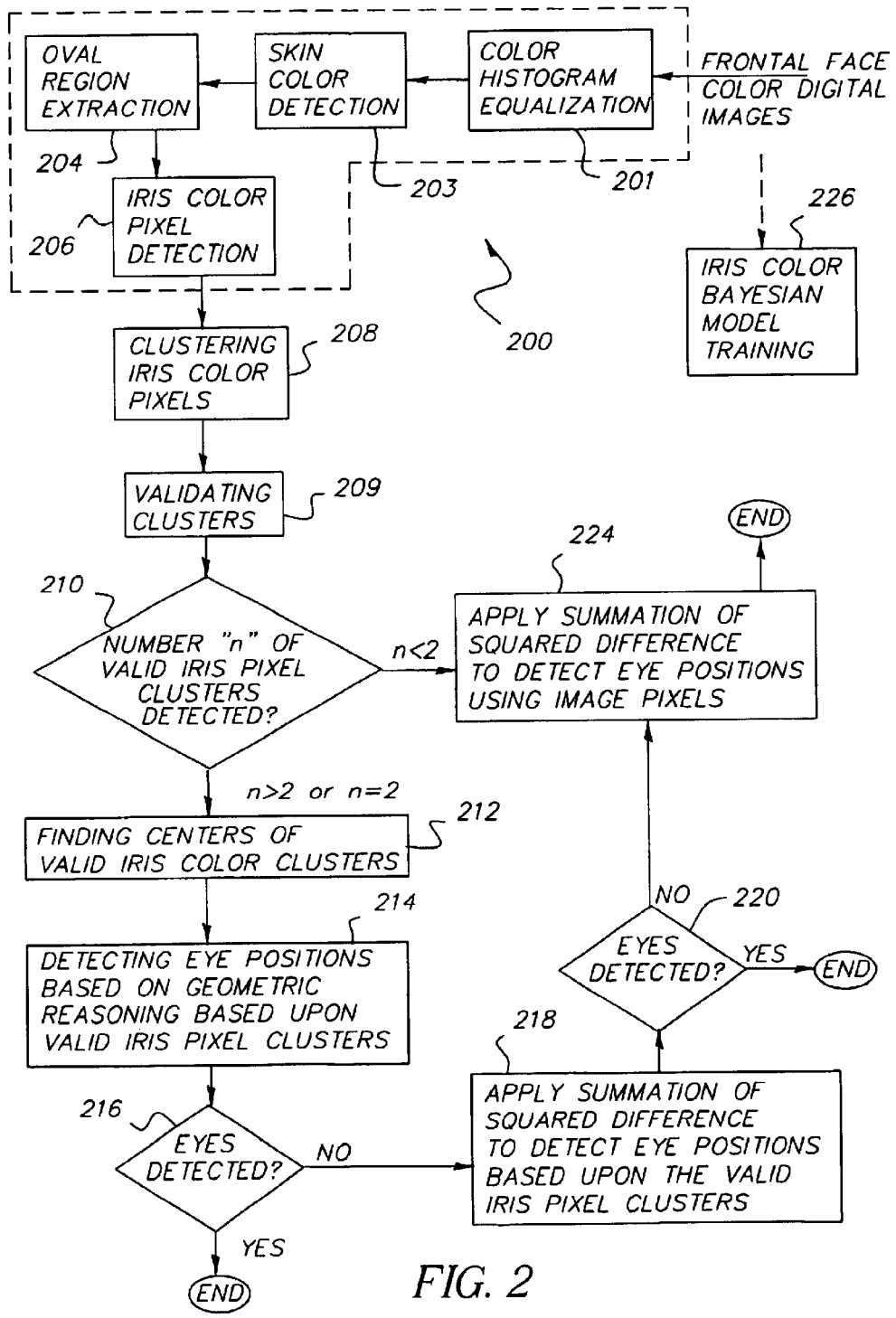
FIG. 2 is a flowchart illustrating the eye detection method of the present invention.

Turning now to FIG. 2, the method of the present invention will be described in greater detail. FIG. 2 is a flow chart illustrating one embodiment of the eye detection method of the present invention. FIG. 2 shows that a digital color image to be processed is first input into an iris color pixel detection step 200. In the embodiment shown, iris color pixel detection is accomplished by first detecting skin color regions in the image and then identifying iris color pixels by measuring red intensity levels from within the skin color regions.

The first step in skin color detection is color histogram equalization shown in FIG. 2 as step 201. Color histogram equalization step 201 receives images to be processed and ensures that the images are in a form that will permit skin color detection. This step is made necessary because human skin may take on any number of colors in an image because of lighting conditions, flash settings and film characteristics. This makes it difficult to automatically detect skin in such images. In Color Histogram Equalization step 201, a statistical analysis of each image is performed. If the statistical analysis suggests that the image may contain regions of skin that have had their appearance modified by lighting conditions, then such images are modified so that skin colored regions can be detected.

After the Color Histogram Equalization step, the image is searched for skin color regions in Skin Color Detection step 202. While it is possible to detect skin in a digital image in a number of ways, a preferred method for detecting skin in a digital image is to separate skin color pixels from other pixels in an image by defining a working color space that contains a range of possible skin colors collected from a large, well-balanced population of images. A pixel is then identified as skin color pixel if the pixel has a color that is within the working color space.

Skin Color Detection step 202 identifies a region of skin color pixels in the image. This region can be defined in any number of ways. In one embodiment, the skin color region is defined by a set of pixel locations identifying the pixels in the image having skin colors. In another embodiment, a modified image is generated that contains only skin color pixels. In yet another embodiment, Skin Color Detection step 202 defines boundaries that confine the skin color region in the image. It will be recognized that more than one skin color region can be identified in the image.

Oval Region Extraction step 204 examines the skin color regions detected by the Skin Color Detection step 202 to locate skin color regions that may be indicative of a face. Because the human face has a roughly oval shape, the skin color regions are examined to locate an oval shaped skin color region. When an oval shaped skin color region is found, the Oval Region Extraction step 204 measures the geometric properties of the oval shaped skin color region. The Oval Region Extraction step 204 uses these measurements to define parameters that describe the size of the face and the location of the face within the image.

Figure 3:
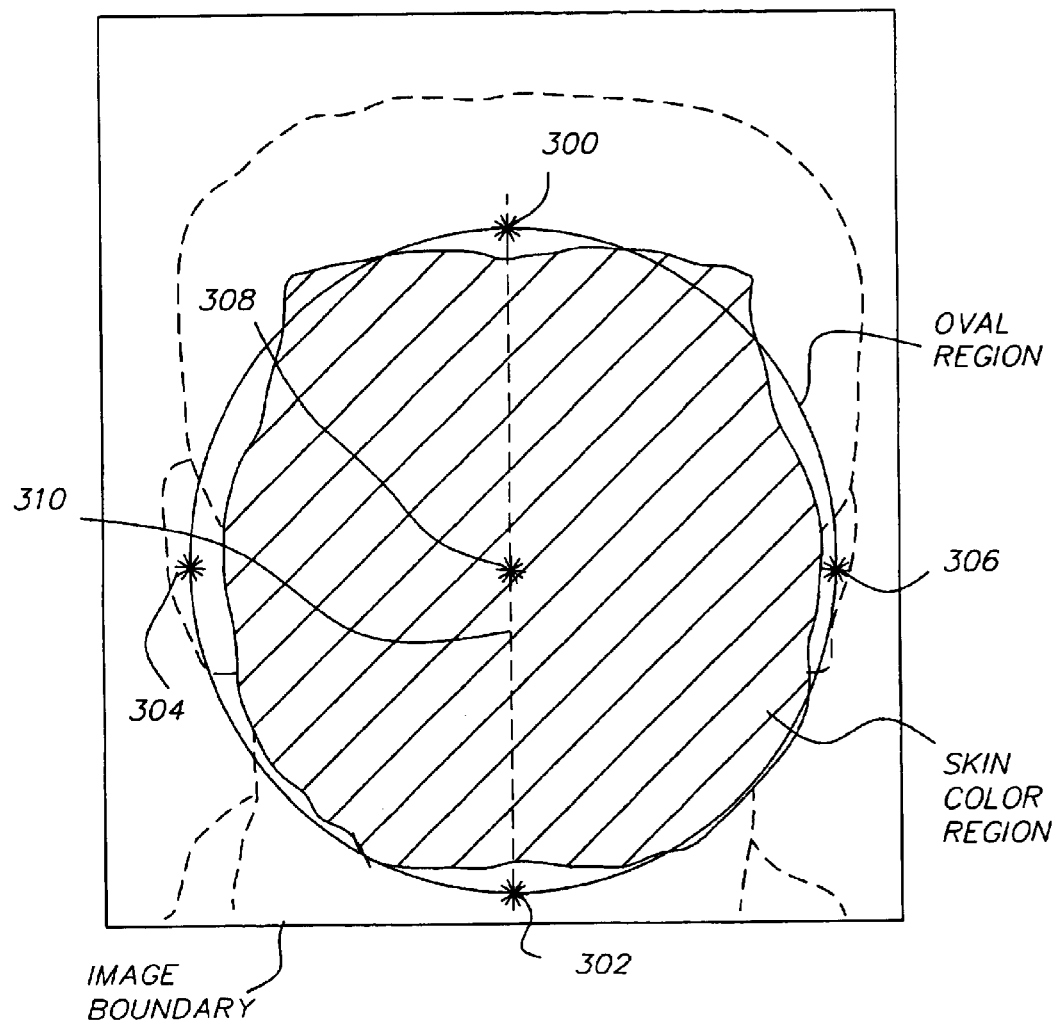
FIG. 3 is an illustration of the relationship between certain geometric parameters and an oval shaped skin color region in an image.

FIG. 3 is an illustration of the relationship between the geometric parameters used to define an oval shaped skin color region in the image. As is shown in FIG. 3, these parameters include Oval_top 300, Oval_bottom 302, Oval_left 304, Oval_right 306, Oval_center_row 308, and Oval_center_column 310. These parameters are used in later steps of the present method increase the efficiency of the eye detection process. It will be recognized that the method of the present invention can be practiced using skin color detection regions that have shapes that are other than oval and that other geometric parameters can be defined in association with such shapes. It will also be recognized that it is not necessary to detect an oval or other shaped area in the image. In such a case, the skin color region is examined to detect iris color pixels. Further in this case, still other parameters describing the skin color region are defined for use in the eye detection process.

After oval region extraction has been performed, the oval shaped skin color region is searched for iris color pixels. This step is performed by Iris Color Pixel Detection step 206. It will be recognized that limiting the search for iris color pixels to those pixels within the oval shaped skin color region increases the efficiency of the iris color pixel detection. It will also be recognized that there are many ways for iris pixel detection step 200 to detect pixels that are associated with an iris. Such pixels can be identified by simple color thresholding methods, model mapping and other methods well known in the art.

In one preferred embodiment, iris pixels are detected using the method claimed and described in co-pending and commonly assigned U.S. patent application Ser. No. [Our Docket 81743] entitled Digital Image Processing Method and Computer Program Product for Detecting Human Irises in an Image. In this embodiment Iris Color Pixel Detection step 206 determines whether a pixel is an iris by measuring the red intensity of the pixel. This is done because it has been observed that a human iris has a low red intensity as compared to human skin which has a relatively high red intensity. However, in this embodiment, iris color pixels are not separated from skin color pixels on the basis of a simple threshold method. Instead, the red intensities of the pixels in the oval shaped skin colored region are used to determine the probability that each pixel is an iris and to determine the probability that each pixel is not an iris. The relationship between the probability that the pixel is an iris and the probability that the pixel is not an iris is then analyzed to determine whether the pixel is an iris pixel.

Figure 4:
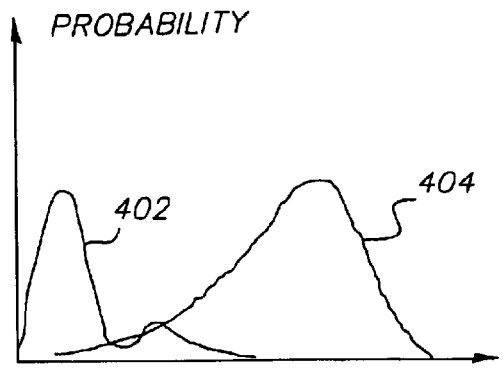
FIG. 4 is an illustration showing, the conditional probability that a given pixel is an iris pixel stated as a function of a specific red intensity and the conditional probability that a given pixel is a non-iris pixel as a function of a specific red intensity I.

The probability that a pixel having a given red intensity is an iris pixel is determined based upon an iris statistical model. Similarly, a non-iris statistical model is used to define the probability that a given pixel is not an iris pixel based upon the red intensity level of the pixel. The relationship between these models is non-linear as is shown by way of example in FIG. 4, which is an illustration showing, an example of a statistical model representing the conditional probability 402 that a given pixel is an iris pixel as a function of a specific red intensity and an example of a statistical model representing the conditional probability 404 that a given pixel is a non-iris pixel as a function of a specific red intensity I.

The probability analysis can take many forms. For example, the probabilities can be combined in various ways with a pixel being classified as an iris or not on the basis of the relationship between these probabilities. However, in a preferred embodiment, a mathematical construct known as a Bayes model is used to combine the probabilities to produce the conditional probability that a pixel having a given red intensity belongs to an iris.

In this embodiment, the Bayes model is applied as follows:

$$P(iris \mid I) = \frac{P(I \mid iris)P(iris)}{P(I \mid iris)P(iris) + P(I \mid noniris)P(noniris)},$$

where $P(iris|I)$ is the conditional probability that a given pixel intensity belongs to an iris; $P(I|iris)$ is the conditional probability that a given iris pixel has a specific intensity I; $P(iris)$ is the probability of the occurrence of an iris in the face oval region; $P(I|noniris)$ is the conditional probability that a given non-iris pixel has a specific intensity I; and $P(noniris)$ is the probability of the occurrence of a non-iris pixel in the face oval region. The Bayes model further applies the probability of the occurrence of an iris in a face oval region and the probability of the occurrence of a non-iris pixel in the face oval region. Using a probability analysis based on the Bayes model, a pixel is classified as an iris if the conditional probability that a pixel having a given red intensity belongs to an iris is greater than, for example, 0.05.

In the embodiment described above, only those pixels in the oval shaped skin color region defined by Oval_top 300, Oval_bottom 302, Oval_left 304, and Oval_right 306 are examined. Confining the pixels to be examined to those in the Oval shaped skin color region reduces number of pixels to be examined and decreases the likelihood that pixels that are not irises will be classified as such. It will be understood that confining the pixels to be examined to those in the skin color region, as is described in other embodiments of the present invention, conveys similar advantages. It will also be understood that it is not necessary to detect skin color regions and that the present invention can be practiced by measuring the red intensity of each pixel in the image and determining whether a pixel is an iris based upon the probability analysis described above.

Figure 5:
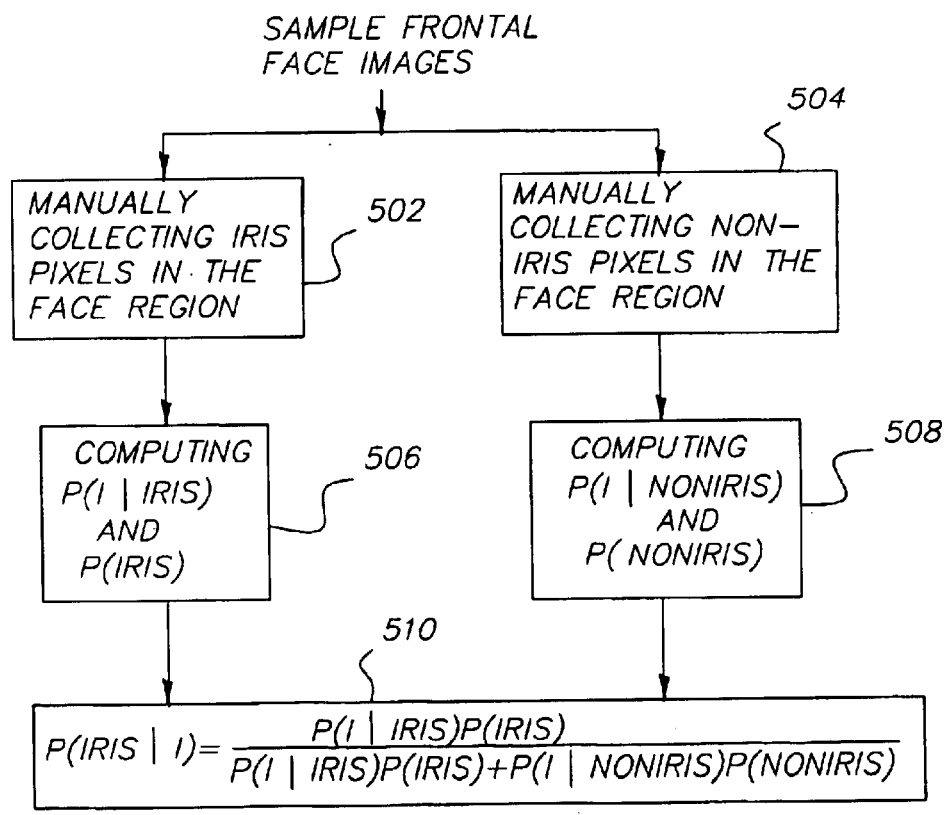
FIG. 5 is a flowchart presenting the process of developing a statistical model representing the conditional probability that a given pixel is an iris pixel as a function of a specific red intensity level and a statistical model representing the conditional probability that a given pixel is a non-iris pixel as a function of a specific red intensity level.

FIG. 5 shows a flow chart illustrating the Iris Color Bayes Model Training step 226 used to define the statistical model used to determine whether the pixel is an iris pixel and the statistical model used to determine whether the pixel is a non-iris pixel. The method of step 226 is performed before the method for detecting irises of the present invention is used to detect irises. As is shown, in FIG. 5, a large sample of frontal face images is collected and examined. All iris pixels and non-iris pixels in the face region are then manually identified 502 and 504. Next, the conditional probability that a given iris pixel has a specific red intensity I, $P(I|iris)$ is computed and the probability of the occurrence of an iris in the face oval region, $P(iris)$ 506 is computed; then the conditional probability that a given non-iris pixel has a specific red intensity I, $P(I|noniris)$ is computed and finally the probability of the occurrence of a non-iris pixel in the face oval region, $P(noniris)$ 508 is computed. The computed statistical models of iris and non-iris are used in the Bayes model to produce the conditional probability that a given pixel intensity belongs to an iris $P(iris|I)$ 510. In certain embodiments the Bayes model can be used to generate a look-up table to be used in Iris Color Pixel Detection step 206.

After the Iris Color Pixel Detection step 206 identifies the location of the iris pixels in the image, the iris color pixels are then assigned to clusters. This is done by Iris Pixel Clustering step 208. A cluster is a non-empty set of iris color pixels with the property that any pixel within the cluster is also within a predefined distance to another pixel in the cluster. One example of a predefined distance is one thirtieth of the digital image height. The Iris Pixel Clustering step 208 of FIG. 2 groups iris color pixels into clusters based upon this definition of a cluster. However, it will be understood that pixels may be clustered on the basis of other criteria.

Under certain circumstances, the definition of a cluster of iris color pixels may be broad enough to include clusters that are invalid. In such a circumstance, as is shown in FIG. 2, the step of validating the clusters is included as step 209. A cluster may be invalid because, for example, it contains too many iris color pixels or because the geometric relationship of the pixels in the cluster suggests that the cluster is not indicative of an iris. For example, if the ratio of a cluster's height to its width is determined, and if the ratio is greater than two, then this cluster is invalid. Invalid iris pixel clusters are removed from further consideration. Accordingly, in the portions of the description that follow, valid iris pixel clusters will be referred to simply as iris pixel clusters.

The number of iris pixel clusters "n" is counted in step 210. The number of iris pixel clusters "n" is used by decision step 210 to select from among two paths for detecting eyes in an image. If the number of iris pixels "n" is less than two then the process is branched to step 224 which is to be described later. If the number of iris color pixels "n" is at least two, then the process branches to step 212 to find the centers of the clusters. The center of a cluster is determined as the center of mass of the cluster. The center position of the clusters is calculated with respect to the origin of the image coordinate system. For the purposes of this measurement, the origin of the image coordinate system is at the upper left corner of the image boundary.

Figure 6:
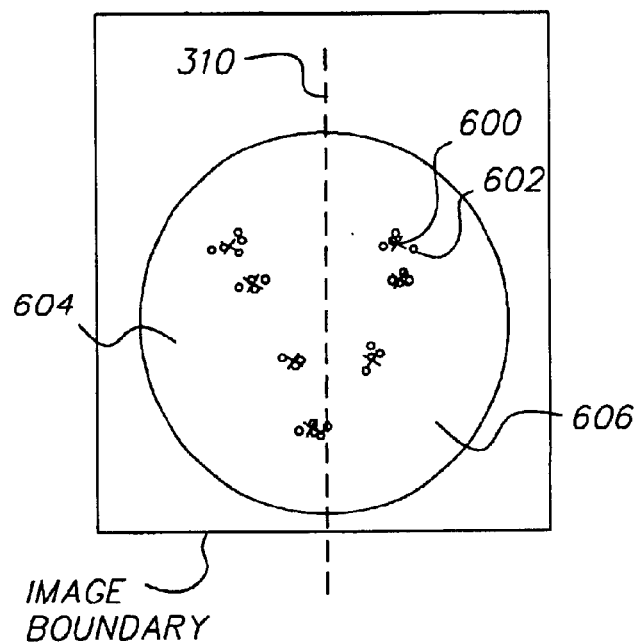
FIG. 6 is an illustration showing the iris color pixel clusters.

After the center of each of the iris pixel clusters is located, geometric reasoning is applied to attempt to detect eyes based on the geometric relationship between the iris pixel clusters. As is shown in FIG. 6, if there are only two clusters remaining, with one in the left-half 604 and one in the right-half 606 and if the horizontal distance between the centers of the two clusters is less than 0.4 times the distance between Oval_right 306 and Oval_left 304 and if the vertical distance between the centers of the two clusters is less than one tenth of the distance between Oval_top 300 and Oval_bottom 302, then the center positions of these two clusters are treated as the eye positions.

It will be appreciated that this analysis can be completed very rapidly. If this analysis is successful, then no further action is required to detect eye positions. Accordingly, a detection result check is done in step 216 to see if eye positions are detected. If eye positions are detected, then the eye detection process stops. If no eye positions are detected, then the process goes to step 218.

In step 218 the summation of squared difference method is used to search the image for eye positions. In general, the summation of the squared difference method involves calculating the summation of the squared difference of the intensity values of the corresponding pixels in an eye template and a patch of the image that has the same size as the template. In this method, each pixel in the patch of pixels has a corresponding pixel in the template. The difference between the intensity level of each of the corresponding pixels is calculated. Each difference is then squared. The sum of each of the squared differences for each of the pixels in the set is then calculated. This summation of the squared differences provides a relative measure of the degree of correspondence between each of the pixel sets measured and the template. If no eye positions are detected 220, then the process goes to 224.

As applied in the present invention, summation of the squared difference values are calculated for each pixel in each window in each half-region. These values are compared and the cluster having the lowest relative summation of the squared difference value is selected identified as an eye location for the respective half region. This process is performed separately on the clusters of the left and the right-half regions of the image in the manner described below.

It will be noted that while the present invention has been described as using the summation of the squared difference method to identify the best relative correlation between the average eye template and each of the patches of pixels, other methods including the mean-squared-error method can be used for this purpose.

In one embodiment of the method of the present invention, the parameters calculated in the Oval Region Detection Step 204 are used to increase the efficiency of the use of the summation of the squared difference method by reducing the number of locations in the image at which the summation of the squared difference must be calculated. As is shown in FIG. 6, in this embodiment, the Oval_Center_Column 310 is used to divide the oval region into a left-half region 604 and a right-half region 606. As is also shown in FIG. 6, iris pixel clusters 600 and the center position 602 of the iris pixel clusters 600 are positioned in either the left-half or right-half regions 604 and 606 separated by the Oval_Center_Column 310.

Step 218 conducts a left-eye position search using the summation of squared difference method and the pixel clusters 600 located on the left-half region 604. Step 218 also conducts a right-eye position search in the right-half region using the summation of squared difference method and the iris pixel clusters 600 located in the right-half region 606.

Figure 8:
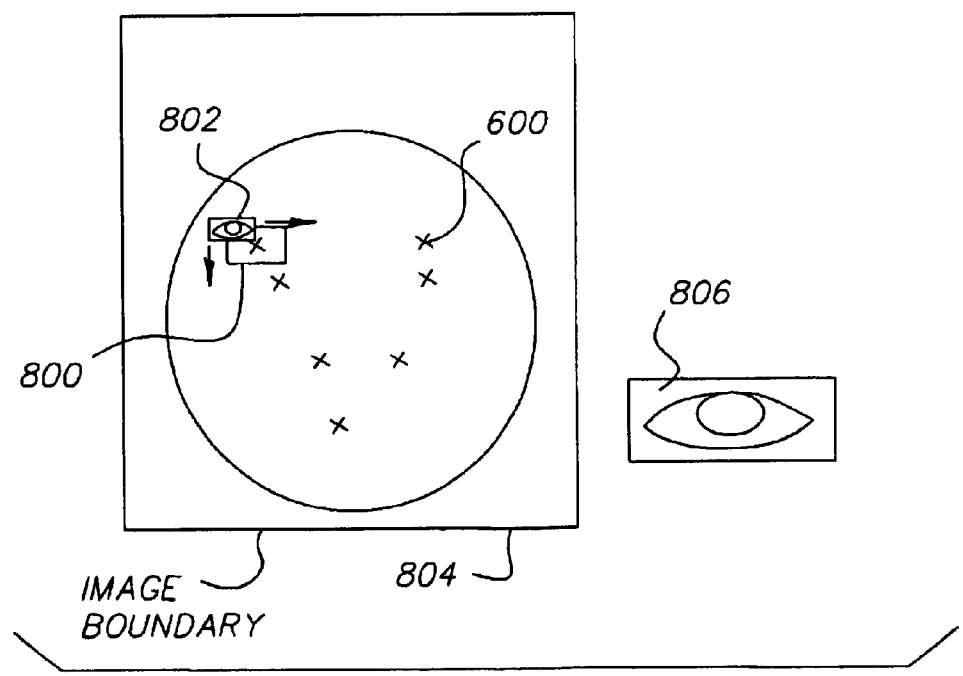
FIG. 8 shows an eye template and a search window centered at the center of an iris pixel cluster.
Figure 7:
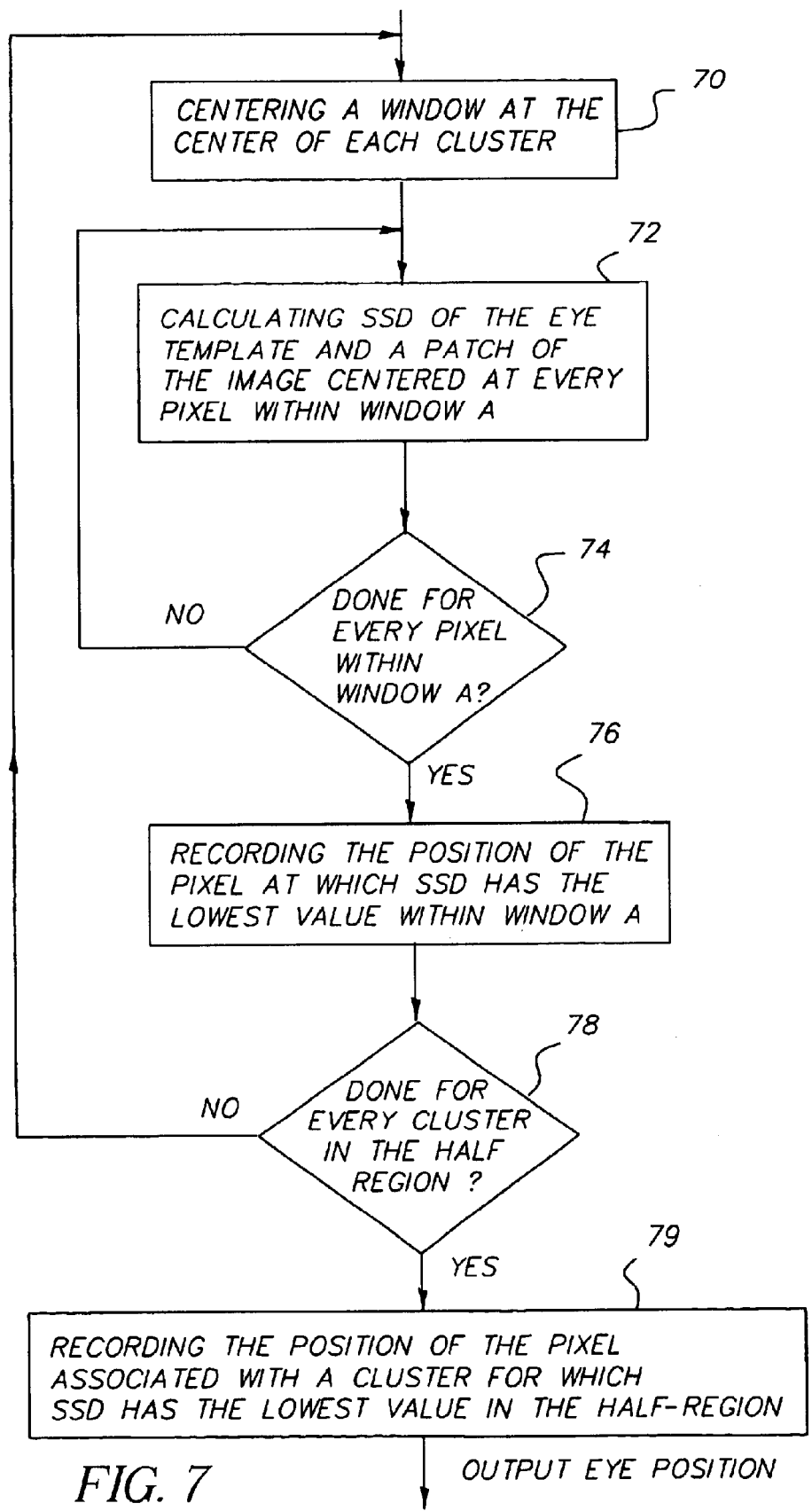
FIG. 7 is a flowchart illustrating the process of applying the method of summation of the squared difference to eye position detection using iris pixel clusters.

Referring now to FIGS. 7 and 8, the process for selecting one cluster from the clusters in a half region will be described. The eye position search process is started by centering 70 a window 800 at the center of each cluster 802 in a respective half-region. The default size for window 800 is one twentieth of the size of the image 804. The operation of calculating the summation of the squared differences 72 is then performed on each of the pixels in each window 800. The position of the pixel having the lowest summation of squared difference value in each window 800 is recorded 76. When a summation of the squared difference value has been calculated for every pixel in every window of the half-region 78, the position of the pixel having the lowest summation of squared difference value is recorded 79. This is the estimated eye position for a half-region. This process is repeated for the remaining half-region. If two eyes are detected by this process, then the method is ended.

It will be appreciated that the summation of the squared difference method of step 218 can also be performed without the use of Oval Shaped Skin Color Extraction. In such an embodiment, the skin color region can be divided into a left-half region and a right-half region. Iris pixel clusters can then be divided into left-half region and right-half region clusters. The summation of the squared difference method can then be applied as described above.

Figure 9:
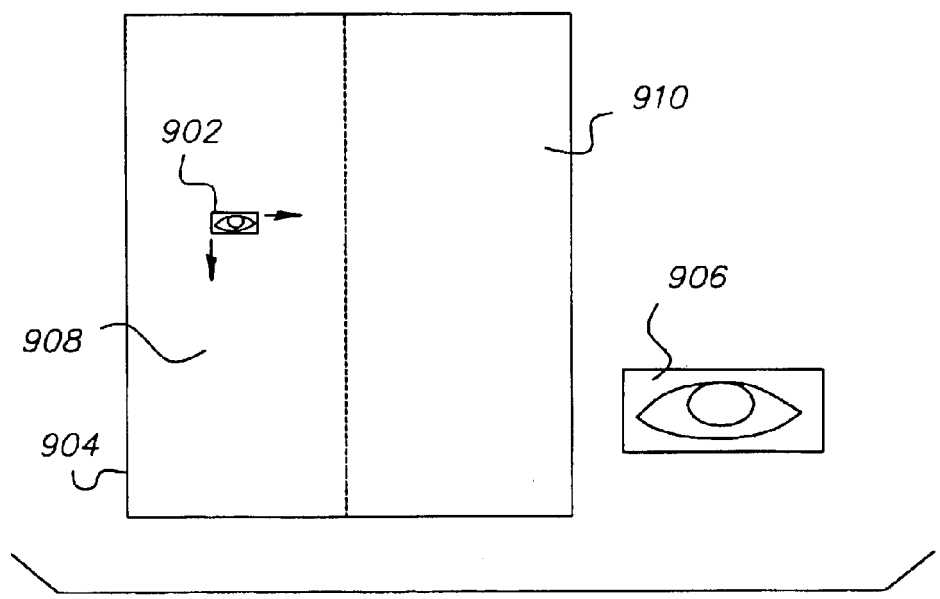
FIG. 9 shows an eye template and an image as used in the process of applying the method of summation of the squared difference to eye position detection using image pixels.

However, if eyes have not been detected 220 after the execution of step 218, or if less than two iris pixel clusters are detected at step 209 then the eye detection process goes to step 224. Step 224 operates in a manner that is similar to step 218. However, as is shown in FIG. 9, the entire image 900 is divided and a summation of the squared difference is calculated for every pixel of the image 904 in the left-half 908 and right-half 910 region respectively.

It will be understood that other methods can be used in place of the summation of squared difference method to determine the relative correlation between a patch of an image and an eye template. One example is the mean-squared error method. This method is well known in the art.

It will be appreciated that the present invention provides three distinct steps methods to detect eyes in an image; geometric reasoning 212 and 214, summation of the squared difference using iris pixel clusters 218 and summation of the squared difference using image pixels 224. It will also be understood that geometric reasoning is the simplest and most efficient of these methods. This is because geometric reasoning provides the most efficient processing method and because geometric reasoning is applied only to iris pixel clusters. These clusters are relatively small in number when compared to the number of pixels in the image.

In contrast, applying a summation of the squared difference method to each of the pixels in an image as is required in step 224 is a computationally heavy step, requiring many processing steps and calculations to determine whether a single pixel in the image is an eye position. Further, the method of step 224 must be applied to all of the non-iris pixels in an image. In a currently common format, digital images are being acquired by 2.1 megapixel cameras.

Further, cameras having as many as 16 megapixels have been demonstrated. Thus, it is clear that using step 224 to detect eye positions in an image will require, literally, hundreds of millions of operations to process a single image. This is a time and computer intensive process.

As an intermediate approach, step 218 applies a computationally heavy summation of the squared difference method, but limits the application of this method to the pixels in the windows defined about the iris pixel clusters. This substantially reduces the number of pixels to which the summation of the squared difference method must be applied and therefore makes the application of the summation of the squared difference method 220 less computer intensive than the summation of the squared difference method of step 224.

It will also be understood that the method of the present invention provides a way for automatically selecting between these eye detection methods and combining these methods in a manner that uses the number of iris pixel clusters to select the most efficient method for detecting eyes in the image.

The subject matter of the present invention relates to digital image understanding technology, which is understood to mean technology that digitally processes a digital image to recognize and thereby assign useful meaning to human understandable objects, attributes or conditions and then to utilize the results obtained in the further processing of the digital image.

Thus, the present method and computer program product meets the objective of this invention.

The invention has been described in detail with particular reference to certain preferred embodiments thereof, but it will be understood that variations and modifications can be effected within the spirit and scope of the invention.

PARTS LIST

- 10 digital image source
- 12 image processor
- 14 display
- 16 keyboard
- 17 computer readable storage medium
- 18 mouse
- 19 output device
- 502 manually collecting iris pixels step
- 504 manually collecting non-iris pixels step
- 506 computing step
- 508 computing step
- 510 computing step
- 70 centering window step
- 72 summation of squared difference calculator
- 74 checking step
- 76 position recording step
- 78 checking step
- 79 position recording step
- 200 pixel detection
- 201 color histogram equalization step
- 202 skin detection step
- 202 oval region extraction step
- 204 color histogram equalization step
- 206 iris color pixel detection step
- 208 iris pixel clustering step
- 209 pixel validation step
- 210 number of pixels detected decision step
- 212 finding centers of iris color pixel clusters
- 214 detecting eye positions based on geometric reasoning
- 216 eyes detected decision step
- 218 detecting eye positions based on summation of squared difference using iris pixel clusters
- 220 eyes detected decision step
- 224 detecting eye positions using a summation of squared difference -continued

PARTS LIST method using image pixels
- 226 iris color Bayesian model training
- 300 Oval_top
- 302 Oval_bottom
- 304 Oval_left
- 306 Oval_right
- 308 Oval_center_row
- 310 Oval_center_column
- 402 statistical model of probability that a pixel is an iris
- 404 statistical model of probability that a pixel is not an iris
- 502 manually identifying iris pixels for statistical model
- 504 manually identifying non-iris pixels for statistical model
- 506 computing probability step
- 508 computing probability step
- 510 applying Bayes model
- 600 cluster center
- 602 iris color pixel
- 604 left half region
- 606 right half region
- 800 a window
- 802 average eye template moving in window
- 804 image
- 806 average eye template
- 902 an average eye template moving in the image
- 904 image
- 906 average eye template
- 908 a left-half of image
- 910 a right-half

What is claimed is:

1. A digital image processing method for detecting human eyes in a digital image, comprising the steps of:
   - detecting iris pixels;
   - clustering the iris pixels;
   - determining the number of iris pixel clusters;
   - selecting at least one of the following methods to identify eye positions in an image:
     - i) applying geometric reasoning to detect eye positions using the iris pixel clusters;
     - ii) applying a summation of squared difference to detect eye positions based the iris color pixel clusters;
     - iii) applying a summation of squared difference method to detect eye positions from the pixels in the image;
   - wherein the applying step is selected on the basis of the number of iris pixel clusters.

2. The method of claim 1, wherein applying step iii) is selected when less than two iris pixel clusters are detected.

3. The method claimed in claim 2, wherein the step of applying a summation of squared difference method to detect eye positions from the pixels in the image comprises the steps of:
   - dividing the image pixels into left-half pixels and right-half pixels;
   - locating the most likely left eye position based on the summation of squared difference between an average eye and patch of the image centered at each of the left-half pixels; and
   - locating the most likely right eye position based on the summation of squared difference between an average eye and patch of the image centered at each of the right-half pixels.

4. The method of claim 3 further comprising detecting a skin color region in the image, wherein the summation of the squared difference method is only applied to pixels within the skin color region.

5. The method of claim 3 further comprising detecting a skin color region in the image, wherein the summation of the squared difference method is only applied to pixels within the skin color region.

6. The method of claim 1, wherein applying step i) is selected when at least two iris pixel clusters are detected.

7. The method of claim 6, wherein method i) is first applied and method ii) is subsequently applied in the event that method i) does not detect at least two eye positions.

8. The method of claim 7, wherein method ii) does not detect eye positions and wherein method iii) is then applied.

9. The method claimed in claim 8, wherein the step of applying a summation of squared difference method to detect eye positions from the pixels in the image comprises the steps of:
- dividing the image pixels into left-half pixels and right-half pixels;
- locating the most likely left eye position based on the summation of squared difference between an average eye and patch of the image centered at each of the left-half pixels; and
- locating the most likely right eye position based on the summation of squared difference between an average eye and patch of the image centered at each of the right-half pixels.

10. The computer program product of claim 9, wherein the step of applying geometric reasoning using the detected iris color pixels comprises the steps of:
- finding the center of each iris pixel cluster;
- dividing the iris pixel clusters into left-half iris pixel clusters and right-half iris pixel clusters; and
- detecting a pair of eyes based on the geometric relationship between the left-half iris pixel clusters and the right-half iris pixel clusters.

11. The method of claim 7, wherein the step of applying the summation squared difference method to detect eye positions based upon the iris pixel clusters, comprises the steps of:
- finding the center of each iris pixel cluster;
- defining a window of pixels surrounding each of the centers of the iris pixel clusters in the image;
- dividing the iris pixel clusters into left-half pixel clusters and right-half iris pixel clusters;
- locating the most likely left eye position based on the summation of squared difference between an average eye and patches of the image centered at each of the pixels in each of the windows surrounding a left-half iris pixel cluster; and
- locating the most likely right eye position based on the summation of squared difference between an average eye and patches of the image centered at each of the pixels in each of the windows surrounding a right-half iris pixel cluster.

12. The method of claim 11 further comprising the steps of detecting a skin color region in the image, and dividing the skin color region into a left-half region and right-half region wherein the iris pixel clusters are divided into left-half iris pixel clusters and right-half iris pixel clusters based upon the region in which they are located.

13. The method of claims 6, wherein the step of applying geometric reasoning using the detected iris color pixels comprises the steps of:
- finding the center of each iris pixel cluster;
- dividing the iris pixel clusters into left-half pixel clusters and right-half pixel clusters; and
- detecting a pair of eyes based on the geometric relationship between the iris pixel clusters.

14. The method of claim 1, wherein the step of applying geometric reasoning using the detected iris color pixels comprises the steps of:
- finding the center of each iris pixel cluster;
- dividing the iris pixel clusters into left-half pixel clusters and right-half pixel clusters; and
- detecting a pair of eyes based on the geometric relationship between the iris pixel clusters.

15. The method of claim 1, wherein the step of applying the summation squared difference method to detect eye positions based upon the iris pixel clusters, comprises the steps of:
- finding the center of each iris pixel cluster;
- defining a window of pixels surrounding each of the centers of the iris pixel clusters in the image;
- dividing the iris pixel clusters into left-half pixel clusters and right-half iris pixel clusters;
- locating the most likely left eye position based on the summation of squared difference between an average eye and patches of the image centered at each of the pixels in each of the windows surrounding a left-half iris pixel cluster; and
- locating the most likely right eye position based on the summation of squared difference between an average eye and patches of the image centered at each of the pixels in each of the windows surrounding a right-half iris pixel cluster.

16. The method of claim 15 further comprising the steps of detecting a skin color region in the image, and dividing the skin color region into a left-half region and right-half region wherein the iris pixel clusters are divided into left-half iris pixel clusters and right-half iris pixel clusters based upon the region in which they are located.

17. The method of claim 1, wherein the step of applying a summation of squared difference method to detect eye positions from the pixels in the image comprises the steps of:
- dividing the image pixels into left-half pixels and right-half pixels;
- locating the most likely left eye position based on the summation of squared difference between an average eye and patch of the image centered at each of the left-half pixels; and
- locating the most likely right eye position based on the summation of squared difference between an average eye and patch of the image centered at each of the right-half pixels.

18. The method of claim 17, further comprising detecting a skin color region in the image, wherein the summation of the squared difference method is only applied to pixels within the skin color region.

19. The method of claim 1 further comprising the step of validating iris pixel clusters, wherein the selection of the method to be applied is made based upon the number of valid clusters.

20. A computer program product for detecting human eyes in a digital image, the computer program product comprising a computer readable storage medium having a computer program stored thereon for performing the step of:
- detecting iris pixels;
- clustering the iris pixels;
- selecting at least one of the following methods to identify eye positions in the image:
  i) applying geometric reasoning to detect eye positions using the iris pixel clusters;

ii) applying a summation of squared difference method to detect eye positions based upon the iris pixel clusters; and iii) applying a summation of squared difference method using non-iris pixels to detect eye positions;

wherein the method applied is selected on the basis of the number of valid iris pixel clusters.

21. The computer program product of claim 20, wherein less than two valid iris pixel clusters are detected and wherein detection method iii) is applied.

22. The computer program product of claim 20, wherein at least two valid iris pixel clusters are detected and wherein method i) is applied.

23. The computer program product of claim 22, wherein method i) does not detect eyes and wherein method ii) is then applied to detect eyes.

24. The computer program product of claim 23, wherein method ii) does not detect eyes and wherein method iii) is then applied.

25. The computer program product of claim 23, wherein the step of applying the summation squared method to detect eye positions based upon the iris pixel clusters, comprises the steps of:

finding the center of each cluster;

defining a window of pixels surrounding each of the centers of the pixel clusters in the image;

dividing the iris pixel clusters into left-half pixel clusters and right-half pixel clusters;

locating the most likely left eye position based on the summation of squared difference between an average eye and patch of the image centered at each of the pixels in each of the windows surrounding a left-half iris pixel cluster; and locating the most likely right eye position based on the summation of squared difference between an average eye and patches of the image centered at each of the pixels in each of the windows surrounding a right-half iris pixel cluster.

26. The computer program product of claim 25 further comprising the steps of detecting a skin color region in the image, and dividing the skin color region into a left-half region and a right-half region wherein the iris pixel clusters are divided into left-half iris pixel clusters and right-half iris pixel clusters based upon the region in which they are located.

27. The computer program product of claim 20, wherein the step of applying geometric reasoning using the detected iris color pixels comprises the steps of:

finding the center of each iris pixel cluster;

dividing the iris pixel clusters into left-half iris pixel clusters and right-half iris pixel clusters; and detecting a pair of eyes based on the geometric relationship between the left-half iris pixel clusters and the right-half iris pixel clusters.

28. The computer program product of claim 27 wherein the step of detecting iris color pixels using a Bayes model comprises measuring the red intensity of the pixels in the skin color region;

determining the probability that each pixel is an iris based upon the red intensity of the pixel;

determining the probability that each pixel is not an iris based upon the red intensity of the pixel; and applying the Bayes model to the probability that the pixel is an iris, the probability that the pixel is not an iris, the probability of the occurrence of an iris in the skin colored region and probability of the occurrence of a non-iris pixel in the skin colored region.

29. The computer program product of claim 28, further comprising detecting a skin color region in the image, wherein the summation of the squared difference method is only applied to pixels within the skin color region.

30. The computer program product of claim 27 wherein the step of detecting iris color pixels using a Bayes model comprises measuring the red intensity of the pixels in the skin color region;

determining the probability that each pixel is an iris based upon the red intensity of the pixel;

determining the probability that each pixel is not an iris based upon the red intensity of the pixel; and applying the Bayes model to the probability that the pixel is an iris, the probability that the pixel is not an iris, the probability of the occurrence of an iris in the skin colored region and probability of the occurrence of a non-iris pixel in the skin colored region.

31. The computer program product of claim 30, further comprising detecting a skin color region in the image, wherein the summation of the squared difference method is only applied to pixels within the skin color region.

32. The computer program product of claim 20, wherein the step of applying the summation squared method to detect eye positions based upon the iris pixel clusters, comprises the steps of:

finding the center of each cluster;

defining a window of pixels surrounding each of centers of the pixel clusters in the image;

dividing the iris pixel clusters into left-half pixel clusters and right-half pixel clusters;

locating the most likely left eye position based on the summation of squared difference between an average eye and patch of the image centered at each of the pixels in each of the windows surrounding a left-half iris pixel cluster; and locating the most likely right eye position based on the summation of squared difference between an average eye and patches of the image centered at each of the pixels in each of the windows surrounding a right-half iris pixel cluster.

33. The computer program product of claim 32 further comprising the steps of detecting a skin color region in the image, and dividing the skin color region into a left-half region and a right-half region wherein the iris pixel clusters are divided into left-half iris pixel clusters and right-half iris pixel clusters based upon the region in which they are located.

34. The computer program product claimed in claim 20 wherein the step of applying a summation of squared difference method using image pixels to detect eye positions comprises the steps of:

dividing the pixels in the image into left-half pixels and right-half pixels;

locating the most likely left-eye position based on the summation of squared difference between an average eye and patch of the image centered at each of left-half pixels; and locating the most likely right eye position based on the summation of squared difference between an average eye and patch of the image centered at each of the right-half pixels.

35. The computer program product of claim 34, further comprising detecting a skin color region in the image, wherein the summation of the squared difference method is only applied to pixels within the skin color region.

36. A digital image processing method for detecting human eyes comprising the steps of:
   detecting iris pixels;
   clustering iris pixels;
   determining the number of iris pixel clusters;
   selecting a method for detecting eye positions based upon the number of iris pixel clusters; and
   using the selected method to detect eye positions wherein the step of selecting a method for detecting eye positions based upon the number of iris pixel clusters comprises selecting a series of eye detection steps.

37. The digital image processing method of claim 36, wherein the step of selecting a method for detecting eye positions based upon the number of iris pixel clusters comprises selecting a series of eye detection steps to be executed in sequential fashion.

38. The digital image processing method of claim 37, wherein each eye detection step in the series of eye detection steps is used only where each of the preceding steps has not detected eye positions.

39. The digital image processing method of claim 36, wherein the step of selecting a method for detecting eye positions is based upon the number of iris pixel clusters and the size of the image to be processed.

40. The digital image processing method of claim 36, wherein the step of selecting a method for detecting eye positions is based upon the number of iris pixel clusters and the time required to execute each method.

41. The digital image processing method of claim 36, wherein the step of selecting a method for detecting eye positions is based upon the number of iris pixel clusters and the computational efficiency of the method selected.

42. The digital image processing method of claim 36, wherein the step of selecting a method for detecting eye positions is based upon the number of iris pixel clusters and probability that each method will detect eyes.

* * * * *